(12) United States Patent
Sunako et al.

(10) Patent No.: US 8,038,862 B2
(45) Date of Patent: Oct. 18, 2011

(54) CONNECTING STRUCTURE OF A LIQUID SENDING APPARATUS, FUEL-CELL TYPE ELECTRICITY GENERATING APPARATUS, AND ELECTRONIC DEVICE

(75) Inventors: Takayuki Sunako, Akishima (JP); Yasunari Kabasawa, Hanno (JP); Ichiro Yanagisawa, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 935 days.

(21) Appl. No.: 11/862,912

(22) Filed: Sep. 27, 2007

(65) Prior Publication Data
US 2008/0076002 A1    Mar. 27, 2008

(30) Foreign Application Priority Data
Sep. 27, 2006   (JP) .................................. 2006-263045

(51) Int. Cl.
   *C25B 9/00*      (2006.01)
   *H01M 2/34*      (2006.01)
   *H01M 8/04*      (2006.01)
(52) U.S. Cl. ........ 204/600; 204/601; 429/455; 429/512; 429/513
(58) Field of Classification Search ............... 204/600, 204/601; 429/455, 512, 513
See application file for complete search history.

(56) References Cited

U.S. PATENT DOCUMENTS

| | | | |
|---|---|---|---|
| 6,696,186 B1 | 2/2004 | Herdeg et al. | |
| 6,942,018 B2 | 9/2005 | Goodson et al. | |
| 6,969,567 B1 | 11/2005 | Higley et al. | |
| 6,981,849 B2 | 1/2006 | Kim et al. | |
| 6,991,024 B2 | 1/2006 | Goodson et al. | |
| 7,131,486 B2 | 11/2006 | Goodson et al. | |
| 7,134,486 B2 | 11/2006 | Santiago et al. | |
| 7,185,697 B2 | 3/2007 | Goodson et al. | |
| 7,334,630 B2 | 2/2008 | Goodson et al. | |
| 2003/0215686 A1 | 11/2003 | DeFilippis et al. | |
| 2004/0086779 A1 | 5/2004 | Higley et al. | |
| 2004/0151962 A1 | 8/2004 | Adams | |
| 2006/0046119 A1 | 3/2006 | Ohkawa | |

FOREIGN PATENT DOCUMENTS

| | | |
|---|---|---|
| JP | 2006-022807 A | 1/2006 |
| JP | 2006-095958 A | 4/2006 |
| TW | 536846 B | 6/2003 |
| TW | 560238 B | 11/2003 |
| TW | 200507893 A | 3/2005 |
| TW | I242865 B | 11/2005 |

OTHER PUBLICATIONS

Taiwanese Office Action and Search Report dated Feb. 22, 2011 (and English translation thereof) in counterpart Taiwanese Application No. 096135648.

*Primary Examiner* — Helen O Conley
(74) *Attorney, Agent, or Firm* — Holtz, Holtz, Goodman & Chick, PC

(57) ABSTRACT

Disclosed is a connecting structure of a liquid sending apparatus, including: an electroosmotic flow pump having first and second electrodes upstream and downstream of an electroosmosis material; a flow-path structure which defines with flow-paths for liquid upstream and downstream of the electroosmotic flow pump, which is provided upstream of the electroosmotic flow pump with a ventilation hole communicating with inside and outside of the flow-path, and which is provided with a hydrophobic film which covers the hole and is permeable to bubbles; and a liquid-absorbing body absorbs liquid, which is provided in the flow-path upstream of the electroosmotic flow pump, which comes into abutment against a surface of the electroosmosis material on which the first electrode is provided, and which is formed with a bubble removing passage which passes through the liquid-absorbing body from a hydrophobic film side thereof to the abutment surface against the electrode.

5 Claims, 13 Drawing Sheets

CONNECTING STRUCTURE OF A LIQUID SENDING APPARATUS, FUEL-CELL TYPE ELECTRICITY GENERATING APPARATUS, AND ELECTRONIC DEVICE

BACKGROUND OF THE INVENTION

1. Field of the Invention

The present invention relates to a connecting structure of a liquid sending apparatus having an electroosmotic flow pump using an electroosmosis phenomenon, a fuel-cell type electricity generating apparatus having the connecting structure of the liquid sending apparatus, and an electronic device having the fuel-cell type electricity generating apparatus.

2. Description of Related Art

In recent years, fuel-cells receive attention as clean power supplies having high energy conversion efficiency, and the fuel-cells become commercially practical for fuel-cell automobiles, portable devices, electrical houses.

In the fuel-cell, a pump is used as a power source for sending fuel or water. There are centrifugal type pumps, volume rotary type pumps, volume reciprocating type pumps which are mechanically operated. For example, Japanese Patent Application Laid-open No. 2006-22807 discloses an electroosmotic flow pump which sends liquid without having a mechanically movable portion.

The electroosmotic flow pump uses an electroosmosis phenomenon, and has a structure as shown in FIG. 18. As shown in FIG. 18, the electroosmotic flow pump includes an electroosmosis material 502 charged into a tube member 504, an electrode 501 disposed upstream from the electroosmosis material 502, and an 503 disposed downstream from the electroosmosis material 502. The electroosmosis material 502 comprises a dielectric such as a silica fiber disposed along a flowing direction of the tube member 504.

The electroosmotic flow pump is operated in accordance with the following principle. That is, if liquid comes into contact with the dielectric of the electroosmosis material 502, a surface of the dielectric is electrically charged, counter ions in the liquid gather around the contact interface, and the number of electric charges becomes excessively large. Hence, if voltage is applied between the electrode 501 and the electrode 503 and an electric field is generated in the electroosmosis material 502, counter ions in the liquid move, and the entire liquid flows due to the viscosity of the liquid. When the electroosmosis material 502 is silica, a surface of silica becomes Si—O—, the silica surface is negatively charged, plus ions (counter ions) gather in the liquid, and the number of plus electric charges becomes excessively large in the liquid. Thus, if voltage is applied such that the potential of the electrode 501 becomes higher than that of the electrode 503, the fluid flows in the direction as shown in FIG. 18.

The electroosmotic flow pump is operated in accordance with such a principle, and has a merit that there is no movable portion, the pump can be made compact, and the pump does not create pulsation and noise.

Japanese Patent Application Laid-open No. 2006-95958 proposes an electroosmotic flow pump having a self-filling mechanism and a gas-draining mechanism for driving liquid.

However, if a liquid-sending operation is continued by the electroosmotic flow pump, bubbles are generated due to electrolysis of liquid in the vicinity of both the electrodes. Thus, bubbles generated around the upstream electrode are accumulated on the upstream side, an effective flow-path area of the electroosmosis material is reduced and there is a fear that the liquid sending efficiency is deteriorated. Bubbles generated around the downstream electrode flows downstream together with liquid, there is a fear that a flow rate sensor provided downstream can not detect a precise flow rate of liquid due because bubbles pass.

SUMMARY OF THE INVENTION

The present invention provides a connecting structure of a compact liquid sending apparatus capable of excellently eliminating bubbles generated by an electrode of an electroosmotic flow pump, a fuel-cell type electricity generating apparatus using the connecting structure of the liquid sending apparatus, and an electronic device having the fuel-cell type electricity generating apparatus.

According to a first aspect of the present invention, there is provided a connecting structure of a liquid sending apparatus comprising:

an electroosmotic flow pump having a first electrode upstream of an electroosmosis material and a second electrode downstream of the electroosmosis material;

a flow-path structure which defines with flow-paths for liquid upstream and downstream of the electroosmotic flow pump, which is provided upstream of the electroosmotic flow pump with a ventilation hole communicating with inside and outside of the flow-path, and which is provided with a hydrophobic film which covers the ventilation hole and is permeable to bubbles; and a liquid-absorbing body absorbs liquid, which is provided in the flow-path upstream of the electroosmotic flow pump, which comes into abutment against a surface of the electroosmosis material on which the first electrode is provided, and which is formed with a bubble removing passage which passes through the liquid-absorbing body from a hydrophobic film side thereof to the abutment surface against the electrode.

According to a second aspect of the present invention, there is provided a connecting structure of a liquid sending apparatus comprising:

an electroosmotic flow pump having a first electrode upstream of an electroosmosis material and a second electrode downstream of the electroosmosis material, and a flow-path structure which defines flow-paths for liquid upstream and downstream of the electroosmotic flow pump, which is provided downstream of the electroosmotic flow pump with a ventilation hole communicating with inside and outside of the flow-path, and which is provided with a hydrophobic film which covers the ventilation hole and is permeable to bubbles, wherein the hydrophobic film is annularly provided in the flow-path downstream of the electroosmotic flow pump, and a hydrophilic film which is permeable to liquid is provided on a central portion of the same plane as the hydrophobic film.

According to a third aspect of the present invention, there is provided a connecting structure of a liquid sending apparatus comprising:

an electroosmotic flow pump having a first electrode upstream of an electroosmosis material and a second electrode downstream of the electroosmosis material, a flow-path structure which defines flow-paths for liquid upstream and downstream of the electroosmotic flow pump, which is provided upstream or downstream of the electroosmotic flow pump with a ventilation hole communicating with inside and outside of the flow-path, and which is provided with a hydrophobic film which covers the ventilation hole is permeable to bubbles, and which is provided with a bubble removing passage of a groove which is in communication with the ventilation hole.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

[Electronic Device]

Figure 1:
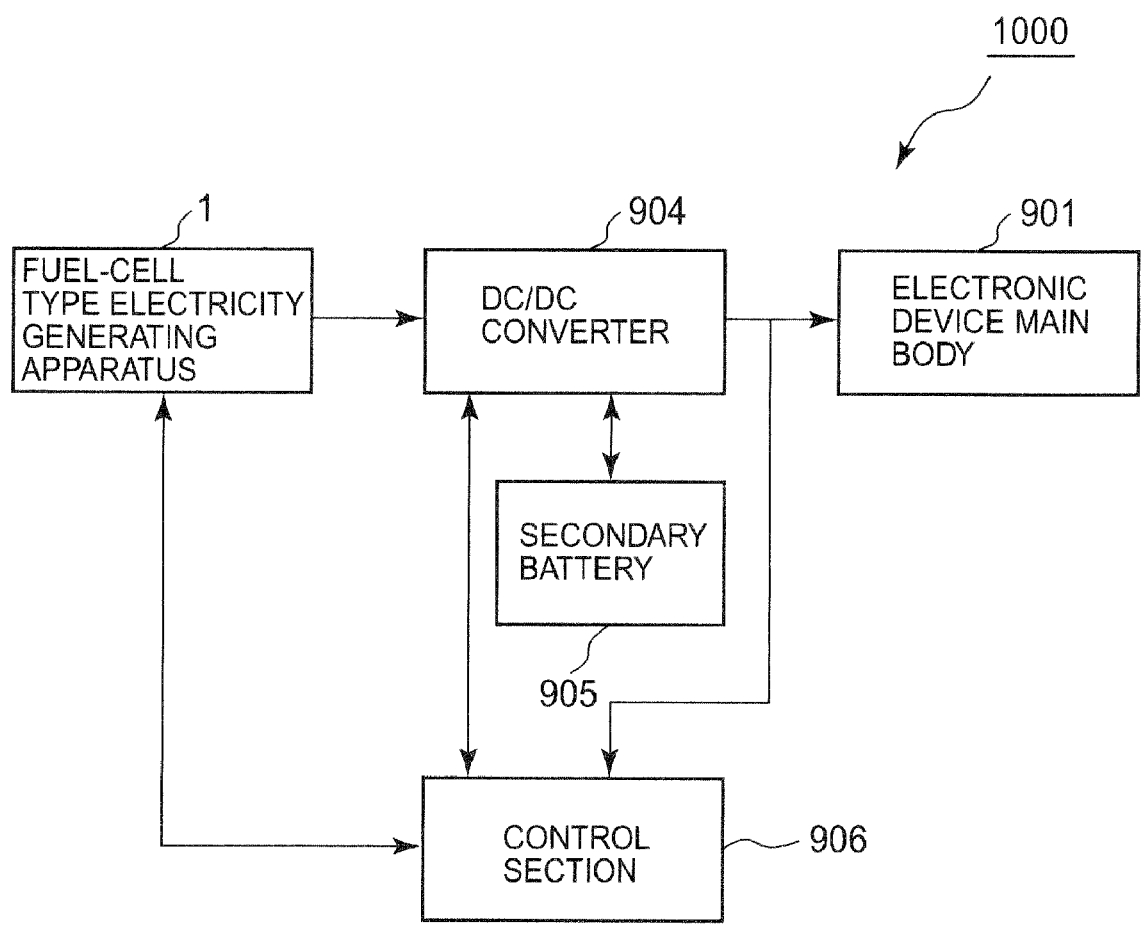
FIG. 1 is a block diagram of an electronic device 1000.

FIG. 1 is a block diagram of an electronic device 1000. The electronic device 1000 includes a fuel-cell type electricity generating apparatus 1, a DC/DC converter 904 for converting electric energy produced by the fuel-cell type electricity generating apparatus 1 into appropriate voltage, a secondary battery 905 connected to the DC/DC converter 904, a control section 906, and an electronic device main body 901 to which electric energy is supplied from the DC/DC converter 904.

As will be described later, the fuel-cell type electricity generating apparatus 1 produces electric energy and outputs the electric energy to the DC/DC converter 904. The DC/DC converter 904 converts electric energy produced by the fuel-cell type electricity generating apparatus 1 into appropriate voltage and supplies the electric energy to the electronic device main body 901 or the control section 906. Further, the DC/DC converter 904 puts the secondary battery 905 on charge using the electric energy produced by the fuel-cell type electricity generating apparatus 1, and when the fuel-cell type electricity generating apparatus 1 is not operated, the DC/DC converter 904 supplies electric energy stored in the secondary battery 905 to the electronic device main body 901 and the control section 906. The control section 906 controls the fuel-cell type electricity generating apparatus 1 and the DC/DC converter 904 so that electric energy is stably supplied to the electronic device main body 901.

Next, the fuel-cell type electricity generating apparatus 1 will be explained in detail.

[Fuel-cell Type Electricity Generating Apparatus]

Figure 2:
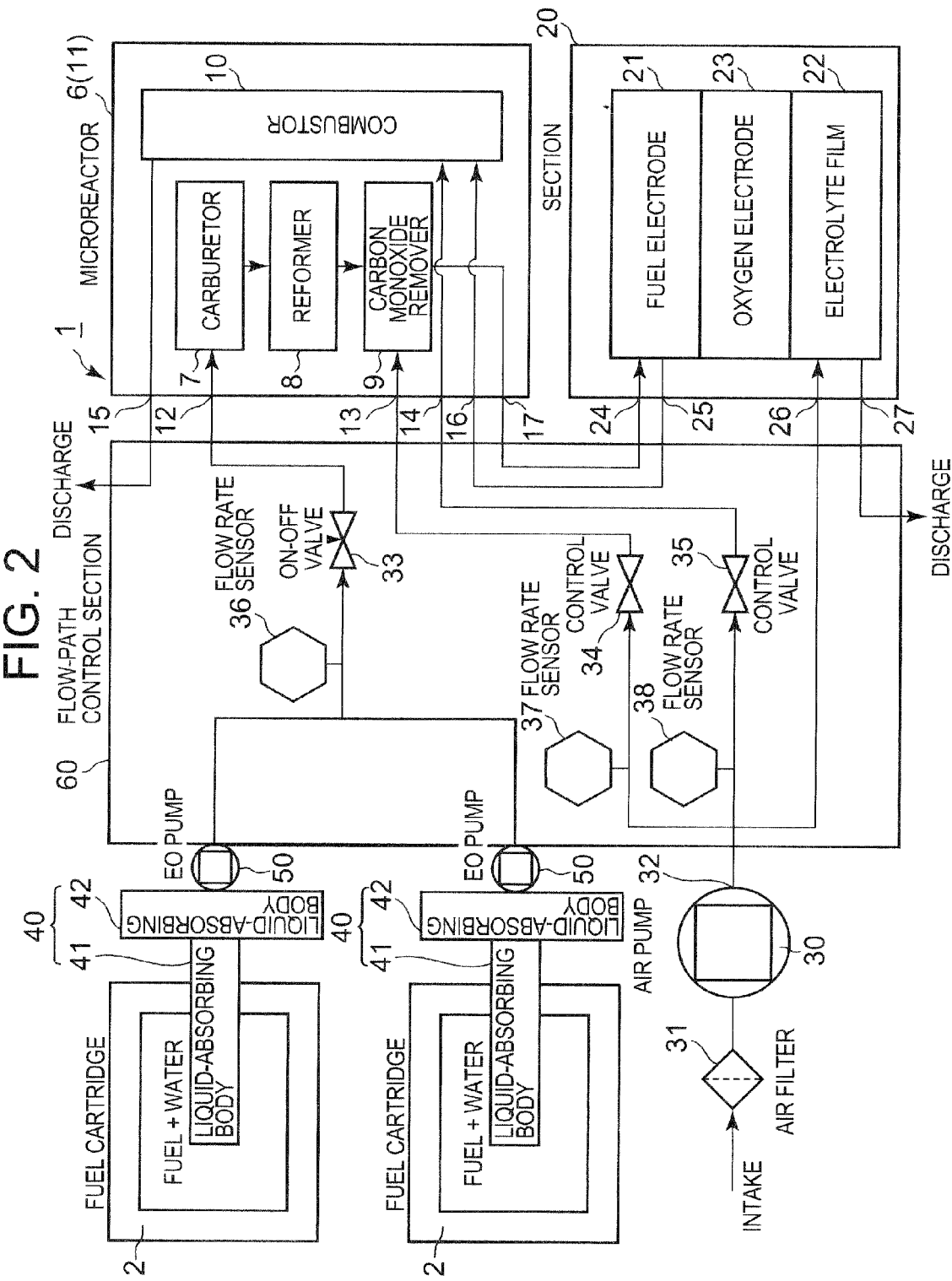
FIG. 2 is a block diagram of a fuel-cell type electricity generating apparatus 1.

FIG. 2 is a block diagram of the fuel-cell type electricity generating apparatus 1. The fuel-cell type electricity generating apparatus 1 includes fuel cartridges 2 and 2, connecting structures 40 and 40 of the liquid sending apparatus, a flow-path control section 60, a microreactor 6, an electricity generating cell 20 (fuel-cell device) and an air pump 30. The fuel-cell type electricity generating apparatus 1 has the two fuel cartridges 2 and 2.

The flow-path control section 60 comprises a multi-layer substrate having a plurality of substrates. The connecting structures 40 and 40 of the liquid sending apparatus, the microreactor 6, the electricity generating cell 20 and the air pump 30 are mounted on a surface of the flow-path control section 60. The flow-path control section 60 is provided therein with micro-valves 33 to 35 and flow rate sensors 36 to 38.

The microvalve 33 is an on-off valve which permits or shuts off flow of liquid mixture flowing toward a carburetor 7 from the connecting structures 40 and 40 of the liquid sending apparatus by opening and closing the microvalve 33. The micro-valve 34 is a control valve (variable valve) for controlling a flow rate of air flowing into a carbon monoxide remover 9 in the microreactor 6 from the air pump 30. The micro-valve 35 is a control valve (variable valve) for controlling a flow rate of air flowing into a combustor 10 in the microreactor 6 from the air pump 30.

The flow rate sensor 36 is provided in a flow-path from the fuel cartridges 2 and 2 to the carburetor 7 in the microreactor 6, and detects a flow rate of liquid mixture flowing from the fuel cartridges 2 and 2 to the carburetor 7. The flow rate sensor 37 is provided in a flow-path from the air pump 30 to the carbon monoxide remover 9 in the microreactor 6, and detects a flow rate of air flowing from the air pump 30 to the carbon monoxide remover 9. The flow rate sensor 38 is provided in a flow-path from the air pump 30 to the combustor 10 in the microreactor 6, and detects a flow rate of air flowing from the air pump 30 to the combustor 10 in the microreactor 6.

A liquid mixture of furl and water is stored in the fuel cartridge 2. A fuel discharge hole is formed in a wall surface of the fuel cartridges 2 and 2. A check valve is fitted into the fuel discharge hole. A later-described liquid-absorbing body 41 of the connecting structure 40 of the liquid sending apparatus is inserted into the check valve.

The check valve is a duckbill valve formed of flexible and elastic material (e.g., elastomer) into a duckbill shape. The check valve is fitted into the fuel discharge hole in a state where a tip end of the duckbill shape is directed inward. The check valve can prevent liquid mixture from leaking outside from the fuel cartridge 2 through the fuel discharge hole.

The fuel discharge hole is opposed to the connecting structures 40 and 40 of the liquid sending apparatus. The fuel cartridges 2 and 2 are detachably attached to the connecting structures 40 and 40 of the liquid sending apparatus.

Each of the connecting structures 40 and 40 of the liquid sending apparatus includes liquid-absorbing bodies 41 and 42 and an electroosmotic flow pump 50. The first liquid-absorbing body 41 has liquid-absorbing properties. The first liquid-absorbing body 41 is inserted into the check valve of the fuel discharge hole and absorbs liquid mixture in the fuel cartridges 2 and 2. The second liquid-absorbing body 42 is made of fiber material which is softer than that of the first liquid-absorbing body 41. The second liquid-absorbing body 42 absorbs liquid mixture sucked by the first liquid-absorbing body 41.

The electroosmotic flow pump 50 sucks liquid mixture sucked by the second liquid-absorbing body 42 as will be described later, and sends liquid mixture to the carburetor 7 in the microreactor 6.

As shown in FIG. 2, the microreactor 6 includes the carburetor 7, a reformer 8, the carbon monoxide remover 9 and the combustor 10 as a unit. The carburetor 7 is in communication with the reformer 8, and the reformer 8 is in communication with the carbon monoxide remover 9. The microreactor 6 is accommodated in the vacuum thermal insulation package 11.

Six ports 12 to 17 are formed in a surface of the microreactor 6 opposed to the flow-path control section 60. The microreactor second port 12 is an input port which is in communication with the carburetor 7. The microreactor second port 13 is an input port which is in communication with the carbon monoxide remover 9. The microreactor third port 14 is an input port which is in communication with the combustor 10. The microreactor fourth port 15 is an output port from the combustor 10. The microreactor fifth port 16 is an input port which is in communication with the combustor 10. The microreactor sixth port 17 is an output port from the carbon monoxide remover 9.

The electricity generating cell 20 includes a fuel electrode 21 carrying a catalyst, an oxygen electrode 22 carrying a catalyst, and an electrolyte film 23 sandwiched between the fuel electrode 21 and the oxygen electrode 22, and these members are formed as a unit.

Four ports 24 to 27 are formed in a surface of the electricity generating cell 20 opposed to the flow-path control section 60. The electricity generating cell second port 24 is an input port which is in communication with the fuel electrode 21. The electricity generating cell second port 25 is an output port from the fuel electrode 21. The electricity generating cell third port 26 is an input port which is in communication with the oxygen electrode 22. The electricity generating cell fourth port 27 is an output port from the oxygen electrode 22.

As shown in FIG. 2, the air pump 30 is provided with an air filter 31 on the suction side, and outside air is sucked by the air pump 30 through the air filter 31. The air pump 30 is provided with a discharge port 32. Air sucked by the air pump 30 is discharged out from the discharge port 32, and the air is supplied to various portions through flow-paths in the flow-path control section 60.

[Operation of Fuel-cell Type Electricity Generating Apparatus]

Next, operation of the fuel-cell type electricity generating apparatus 1 will be explained.

First, liquid mixture is sent from the fuel cartridge 2 to the carburetor 7 by effect of the connecting structures 40 and 40 of the liquid sending apparatus.

If the air pump 30 is operated, outside air is sucked by the air pump 30 through the air filter 31, and the sucked air is sent from the discharge port 32 to the carbon monoxide remover 9, the combustor 10 and the oxygen electrode 22.

The liquid mixture sent to the carburetor 7 is vaporized, mixture of the vaporized fuel and water is sent to the reformer 8. In the reformer 8, hydrogen and carbon dioxide are produced from the mixture supplied from the carburetor 7 by a reforming reaction catalyst, and an extremely small amount of carbon monoxide is also produced. When liquid mixture in the fuel cartridge 2 is liquid mixture of methanol and water, catalyst reactions as shown in equations (1) and (2) occur in the reformer 8.

$$CH_3OH + H_2O \rightarrow 3H_2 + CO_2 \quad (1)$$

$$H_2 + CO_2 \rightarrow H_2O + CO \quad (2)$$

Mixture produced by the reformer 8 is supplied to the carbon monoxide remover 9, and is mixed with air supplied from the discharge port 32 of the air pump 30 through the microreactor second port 13. In the carbon monoxide remover 9, the carbon monoxide gas in the mixture is oxidized preferentially by a selection oxidation reaction catalyst as shown in equation (3) and carbon monoxide is removed.

$$2CO + O_2 \rightarrow 2CO_2 \quad (3)$$

Hydrogen gas is included in the mixture from which carbon monoxide is removed. The mixture is supplied to the fuel electrode 21 of the electricity generating cell 20 from the microreactor sixth port 17 through the electricity generating cell second port 24. Air is supplied to the oxygen electrode 22 from the discharge port 32 of the air pump 30 through the electricity generating cell third port 26. Hydrogen in the mixture supplied from the microreactor sixth port 17 to the fuel electrode 21 through the electricity generating cell second port 24 electrochemically reacts with oxygen in the air supplied to the oxygen electrode 22 through the electrolyte film 23, and electricity is generated between the fuel electrode 21 and the oxygen electrode 22.

When the electrolyte film 23 is a hydrogen ion permeable electrolyte film (e.g., solid high polymer electrolyte film), reaction as shown in equation (4) occurs in the fuel electrode 21, hydrogen ion produced by the fuel electrode 21 passes through the electrolyte film 23, and reaction as shown in equation (5) occurs in the oxygen electrode 22.

$$H_2 \rightarrow 2H^+ + 2e^- \quad (4)$$

$$2H^+ + \tfrac{1}{2}O_2 + 2e^- \rightarrow H_2O \quad (5)$$

Unreacted air in the oxygen electrode 22 is discharged out from the electricity generating cell fourth port 27. Mixture including unreacted hydrogen in the fuel electrode 21 is sent to the combustor 10 from the electricity generating cell second port 25 which is the output port through the microreactor fifth port 16. Air is supplied to the combustor 10 from the discharge port 32 of the air pump 30 through the microreactor third port 14. Hydrogen is oxidized in the combustor 10 and combustion heat is generated, and the carburetor 7, the reformer 8 and the carbon monoxide remover 9 are heated by the combustion heat. Mixture including various products is discharged out from the microreactor fourth port 15 which is the output port of the combustor 10.

[Connecting Structure of Liquid Sending Apparatus]

Figure 3:
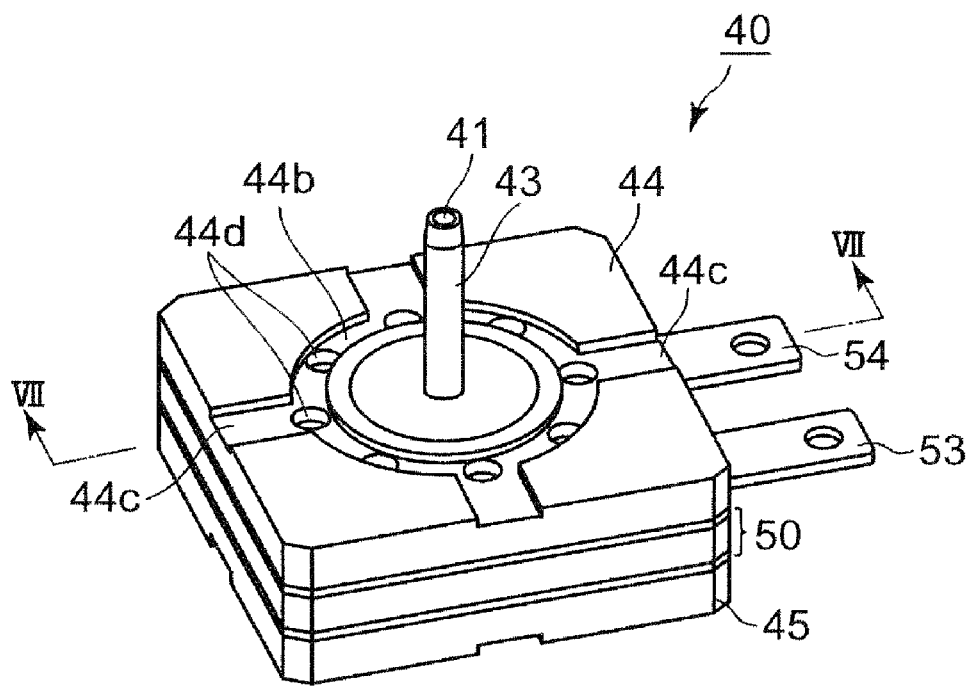
FIG. 3 is a perspective view of a connecting structure 40 of a liquid sending apparatus as viewed from a fuel cartridge 2.
Figure 4:
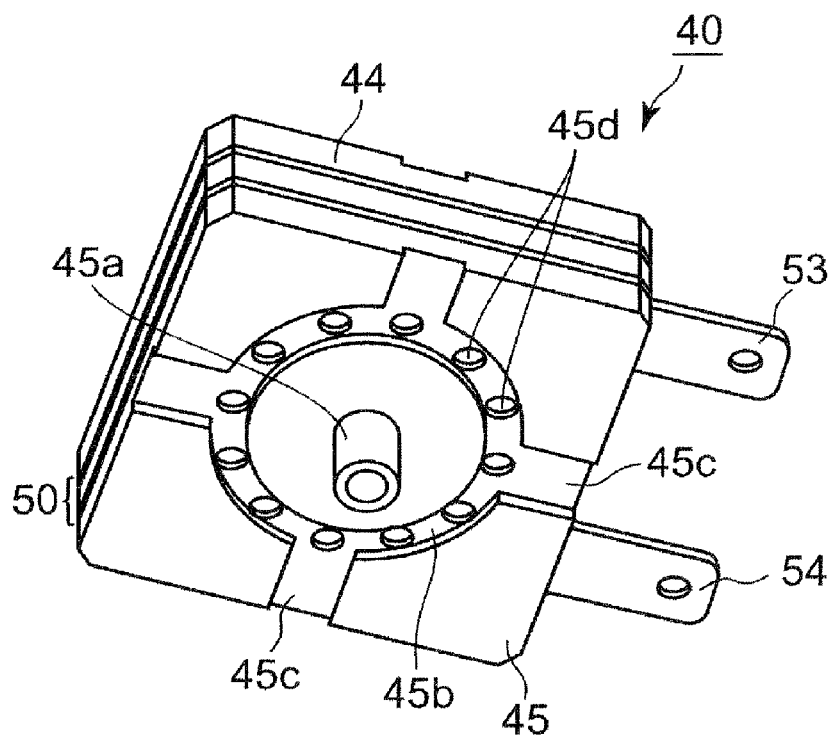
FIG. 4 is a perspective view of the connecting structure 40 of the liquid sending apparatus as viewed from a flow-path control section 60.
Figure 5:
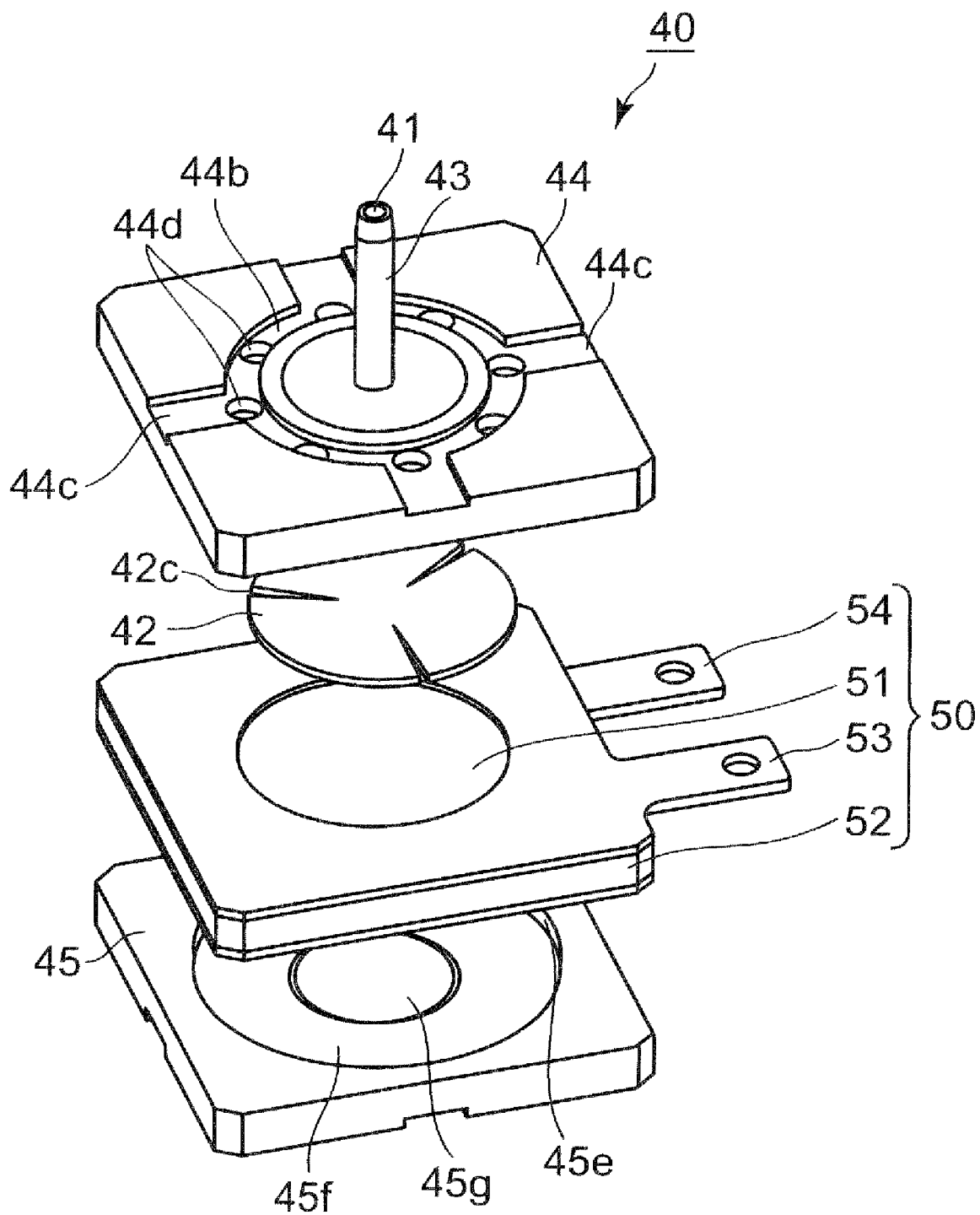
FIG. 5 is an exploded perspective view of the connecting structure 40 of the liquid sending apparatus as viewed from the fuel cartridge 2.
Figure 6:
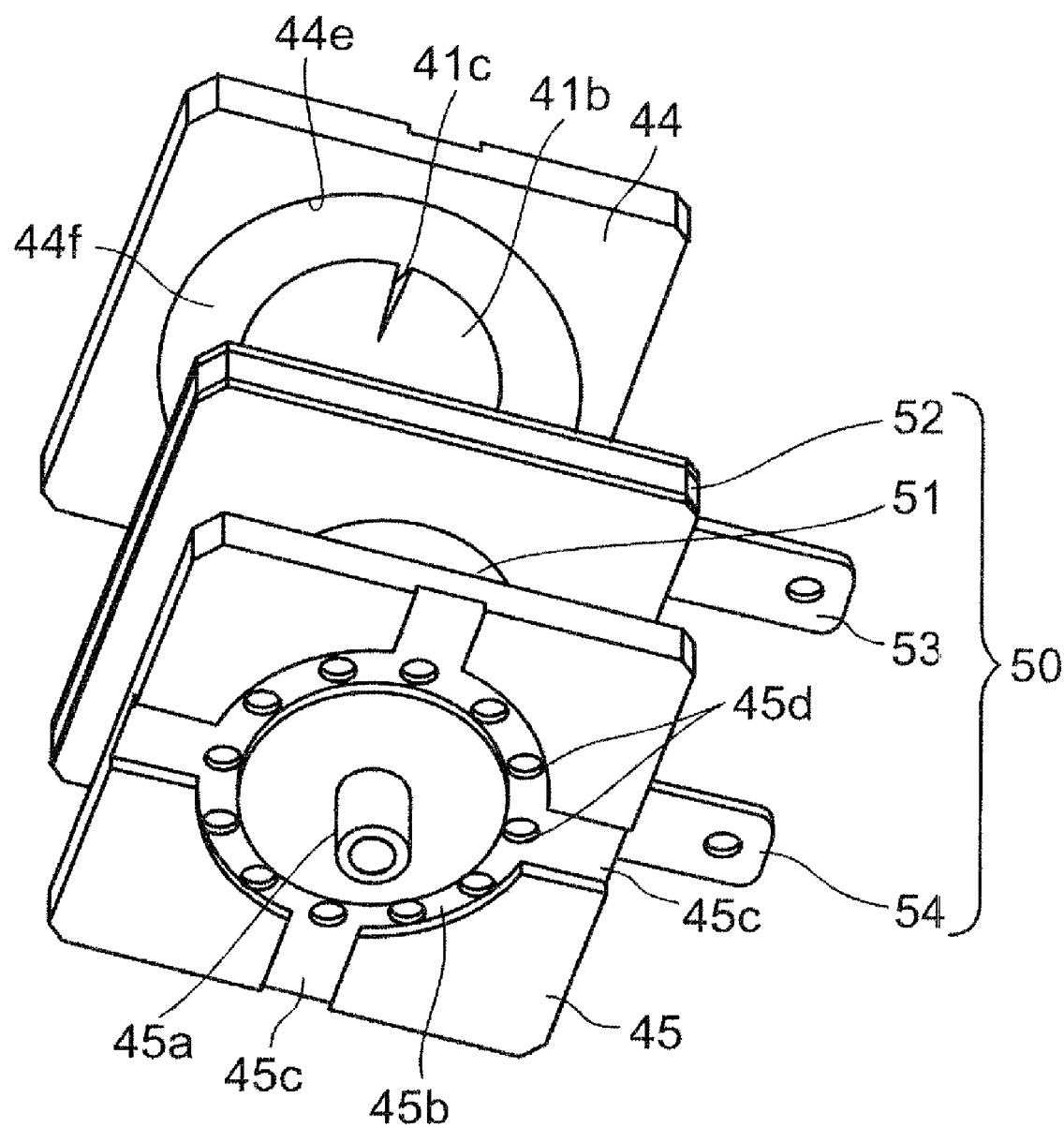
FIG. 6 is an exploded perspective view of the connecting structure 40 of the liquid sending apparatus as viewed from the flow-path control section 60.
Figure 7:
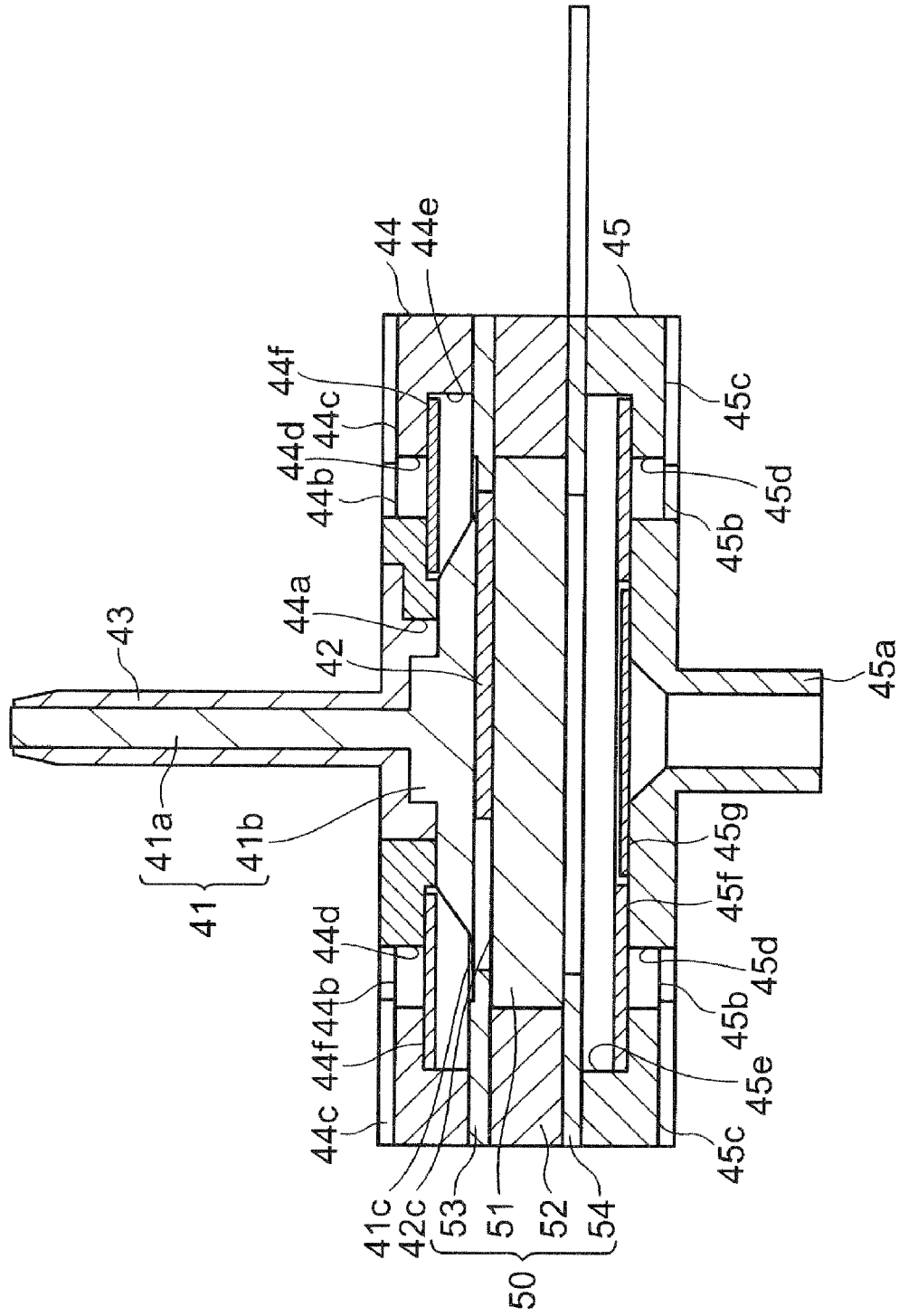
FIG. 7 is a sectional view taken along the line VII-VII in FIG. 3.

Here, a detailed structure of the connecting structure 40 of the liquid sending apparatus will be explained. FIG. 3 is a perspective view of the connecting structure 40 of the liquid sending apparatus as viewed from a fuel cartridge 2. FIG. 4 is a perspective view of the connecting structure 40 of the liquid sending apparatus as viewed from the flow-path control section 60. FIG. 5 is an exploded perspective view of the connecting structure 40 of the liquid sending apparatus as viewed from the fuel cartridge 2. FIG. 6 is an exploded perspective view of the connecting structure 40 of the liquid sending apparatus as viewed from the flow-path control section 60. FIG. 7 is a sectional view taken along the line VII-VII in FIG. 3.

As shown in FIGS. 3 to 7, the connecting structure 40 of the liquid sending apparatus is formed by bonding the electroosmotic flow pump 50, the first liquid-absorbing body 41, the second liquid-absorbing body 42, a hull 43, an inlet-side flow-path structure 44 and an outlet-side flow-path structure 45 to each other.

Figure 8:
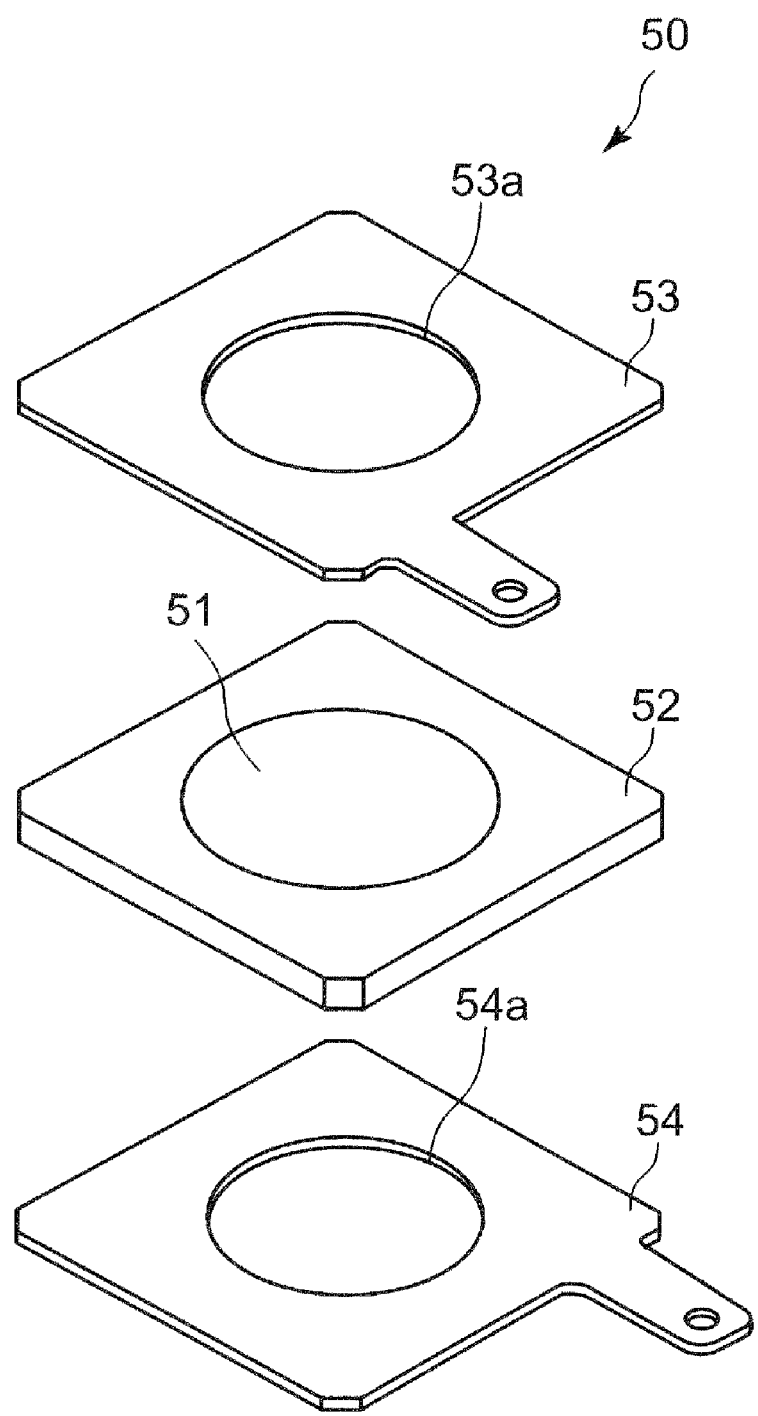
FIG. 8 is an exploded perspective view of an electroosmotic flow pump 50.

FIG. 8 is an exploded perspective view of the electroosmotic flow pump 50. The electroosmotic flow pump 50 includes an electroosmosis material 51, a holder 52 and pull-out electrodes 53 and 54.

The electroosmosis material 51 is accommodated in the holder 52 such that a side surface of the electroosmosis material 51 comes into tight contact with the holder 52. A position of the electroosmosis material 51 in the radial direction is fixed by the holder 52.

The electroosmosis material 51 has dielectric porous material (e.g., porous ceramic), fiber material or particle filler material formed into a disk-like shape, and has liquid-absorbing properties. Both surfaces of the electroosmosis material 51 are coated with platinum by sputtering or deposition, thereby forming electrodes.

The pull-out electrodes 53 and 54 are disposed such that they come into contact with electrodes on both surfaces of the electroosmosis material 51. The pull-out electrodes 53 and 54 are formed with circular openings 53a and 54a having diameters smaller than that of the electroosmosis material 51. Inner peripheries of the pull-out electrodes 53 and 54 abut against outer peripheries of the electrodes of the electroosmosis material 51. A position of the electroosmosis material 51 in the axial direction is fixed by the pull-out electrodes 53 and 54.

The second liquid-absorbing body 42 and the electroosmosis material 51 abut against each other inside of the opening 53a of the pull-out electrode 53. The electroosmosis material 51 absorbs liquid mixture permeates the second liquid-absorbing body 42.

Iron, copper alloy, SUS or the like can be used as material of the pull-out electrodes 53 and 54. The pull-out electrodes 53 and 54 are plated with gold for preventing oxidization reaction caused by contact between the electrode and the liquid mixture. The pull-out electrode and the electrode surface of the electroosmosis material 51 can be connected to each other using conductive adhesive (DOTITE FA-730, XA-819A or the like produced by Fujikura Kasai Co., Ltd.).

Figure 9:
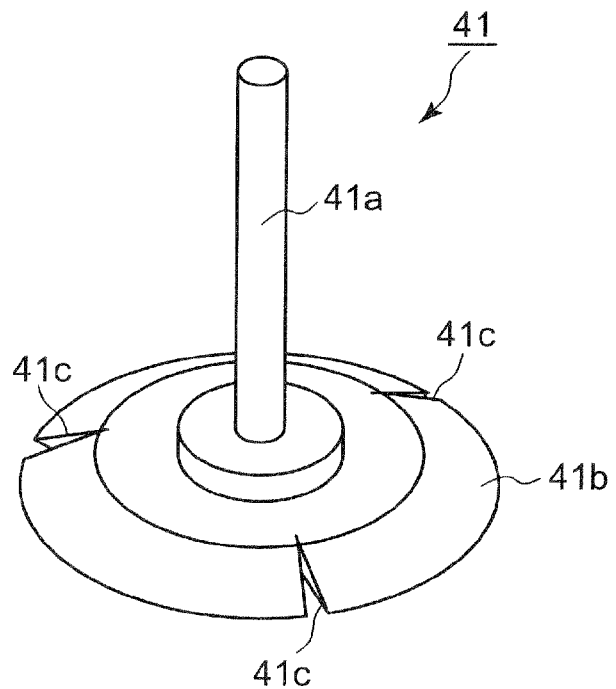
FIG. 9 is a perspective view of a first liquid-absorbing body 41 as viewed from the fuel cartridge 2.
Figure 10:
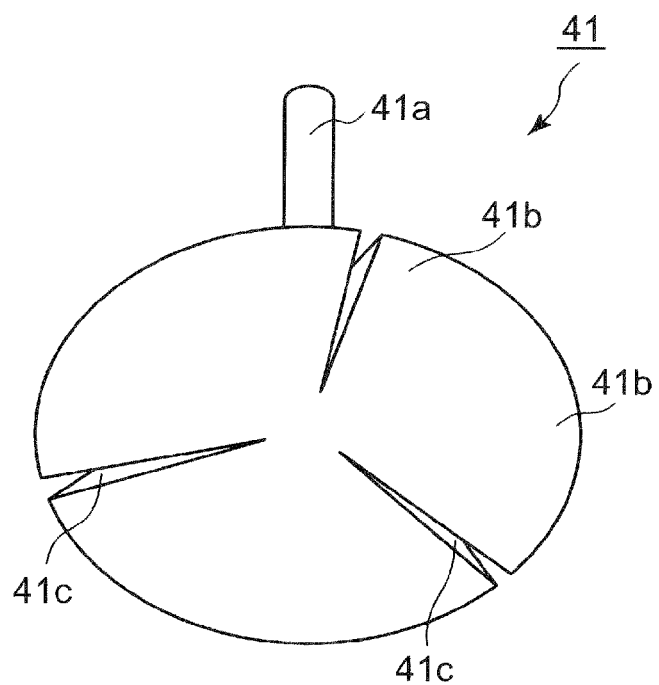
FIG. 10 is a perspective view of the first liquid-absorbing body 41 as viewed from the flow-path control section 60.

FIG. 9 is a perspective view of the first liquid-absorbing body 41 as viewed from the fuel cartridge 2. FIG. 10 is a perspective view of the first liquid-absorbing body 41 as viewed from the flow-path control section 60. As shown in FIGS. 9 and 10, the first liquid-absorbing body 41 comprises integrally formed rod portion 41a and disk portion 41b. The liquid-absorbing body 41 has a hard porous structure, and has liquid-absorbing properties. The first liquid-absorbing body 41 comprises a porous body subjected to liquid penetration processing and formed by sintering polyethylene or polypropylene particles.

The rod portion 41a stands on a center of the disk portion 41b, and is accommodated in the hull 43 for keeping strength. The hull 43 is a cylinder, and is formed by subjecting metal such as SUS to plastic working or cutting machining. In a state where the fuel cartridges 2 and 2 are attached to the flow-path control section 60, the rod portion 41a is inserted into the check valve of the fuel discharge hole together with the hull 43, and comes into contact with liquid mixture in the fuel cartridges 2 and 2. The liquid mixture in the fuel cartridges 2 and 2 is sucked by the first liquid-absorbing body 41 from a tip end of the rod portion 41a.

The rod portion 41a is repeatedly attached to and detached from (inserted into and pulled out from) the check valve of the fuel discharge hole by exchanging the fuel cartridges 2 and 2, but since the rod portion 41a is reinforced by the hull 43, damage of the rod portion 41a caused when it is repeatedly attached to and detached from (inserted into and pulled out from) the check valve can be prevented.

A diameter of the disk portion 41b is substantially the same as those of the second liquid-absorbing body 42 and the electroosmosis material 51 of the electroosmotic flow pump 50. The disk portion 41b moves fuel toward a seat surface by a capillary attraction from a core of the porous body to effectively bring the fuel into contact with the effective flow-path area of the electroosmosis material 51.

As shown in FIGS. 9 and 10, the disk portion 41b is formed with three slits 41c radially.

The second liquid-absorbing body 42 is sandwiched between the disk portion 41b of the first liquid-absorbing body 41 and the electroosmosis material 51. The second liquid-absorbing body 42 has liquid-absorbing properties, and absorbs liquid mixture which permeates the disk portion 41b. The second liquid-absorbing body 42 is made of fiber material which is softer than that of the first liquid-absorbing body 41 and is formed into a disk-like shape. The second liquid-absorbing body 42 is flexible and is elastically deformable. Thus, an impact transferred to the electroosmosis material 51 from the first liquid-absorbing body 41 can be lessened. Adhesion between the first liquid-absorbing body 41 and the electroosmosis material 51 is enhanced and thus, liquid absorbed by the first liquid-absorbing body 41 can effectively be sent to the electroosmosis material 51.

A material having a high affinity for water through which fuel and water can easily pass, or a material in which hydroxyl is coupled to an inner surface to enhance the affinity for water can be used as the second liquid-absorbing body 42. Examples of such materials are nonwoven fabric such as rayon, polyurethane sponge and felt.

Like the disk portion 41b of the first liquid-absorbing body 41, the second liquid-absorbing body 42 is formed with slits 42c radially.

The slits 41c and 42c formed in the first liquid-absorbing body 41 and the second liquid-absorbing body 42 function as bubble removing passage through which bubbles generated from the electrodes on the surfaces of the electroosmosis material 51 are guided to outside of the pump. A width of each of the slits 41c and 42 becomes wider toward the outside so that bubble can easily escape outside.

The inlet-side flow-path structure 44 is provided on the electroosmotic flow pump 50 at a side closer to the fuel cartridge 2. The inlet-side flow-path structure 44 is formed at its central portion with an introducing hole 44a through which the rod portion 41a is inserted and to which the hull 43 is fitted. An outer periphery of the introducing hole 44a is sandwiched between the hull 43 and the disk portion 41b in the vertical direction.

An annular groove 44b is formed in a surface of the inlet-side flow-path structure 44 on the side of the fuel cartridge 2 around the introducing hole 44a. Straight grooves 44c are formed toward outside in four directions from the annular groove 44b. The annular groove 44b is formed with a plurality of ventilation holes 44d which penetrate the inlet-side flow-path structure 44. The annular groove 44b, the straight groove 44c and the ventilation holes 44d function as oxygen removing passages (bubble removing passages).

Even if a surface of the inlet-side flow-path structure 44 on the side of the fuel cartridge 2 is in intimate contact with the surface of the fuel cartridge 2, the ventilation holes 44d is not closed because the annular groove 44b and the straight groove 44c are provided. Therefore, bubbles discharged from the ventilation holes 44d can reliably be discharged outside.

A recess 44e in which the disk portion 41b is accommodated is formed in a surface of the inlet-side flow-path structure 44 on the side of the electroosmotic flow pump 50. The plurality of ventilation holes 44d penetrate the recess 44e, and an annular hydrophobic film 44f is pasted such as to cover the ventilation holes 44d. The hydrophobic film 44f has such properties that gas such as oxygen and hydrogen can pass through the hydrophobic film 44f but liquid such as water and methanol can not pass through the hydrophobic film 44f.

In a fuel-cell mounted in an electronic device, an attitude of equipment can not be fixed in some cases. Especially in the case of equipment such as a laptop PC which is always carried out and used, a liquid sending apparatus disposed in a fuel-cell main body is moved so that its vertical direction becomes unstable. Even if the vertical direction of the electroosmotic flow pump 50 becomes unstable, the annular hydrophobic film 44f disposed in the electroosmotic flow pump 50 can stably discharge bubbles generated from the inlet-side electrode on the surface of the electroosmosis material 51 and bubbles do not stay.

An outer periphery of the recess 44e is bonded to the pull-out electrode 53, and oxygen bubbles discharged from the slits 41c and 42c of the first liquid-absorbing body 41 and the second liquid-absorbing body 42 are guided to the ventilation holes 44d.

A connection tube 45a projects from a center of a surface of the outlet-side flow-path structure 45 on the side of the flow-path control section 60, and a flow-path for liquid mixture is formed in the connection tube 45a. The connection tube 45a is connected to a flow-path which is connected to the microvalve 33 of the flow-path control section 60.

An annular groove 45b is formed around the connection tube 45a in a surface of the outlet-side flow-path structure 45 on the side of the flow-path control section 60, and straight grooves 45c are formed toward outside in four directions from the annular groove 45b. The annular groove 45b is formed with a plurality of ventilation holes 45d which penetrate the outlet-side flow-path structure 45. The annular groove 45b, the straight grooves 45c and the ventilation holes 45d function as hydrogen removing passages (bubble removing passages).

Even if the surface of the outlet-side flow-path structure 45 on the side of the flow-path control section 60 and the surface of the flow-path control section 60 come into intimate contact with each other, since the annular groove 45b and the straight grooves 45c are provided, the ventilation holes 45d are not closed, and bubbles discharged from the ventilation holes 45d can reliably be discharged outside.

A recess 45e connected to the flow-path of the connection tube 45a is formed in a surface of the outlet-side flow-path structure 45 on the side of the electroosmotic flow pump 50. A ventilation holes 45d penetrates the recess 45e. An annular hydrophobic film 45f is pasted on the recess 45e such as to cover the ventilation hole, and a hydrophilic film 45g is pasted such as to cover the flow-path of the connection tube 45a. Liquid such as water and methanol can pass through the hydrophilic film 45g but gas such as oxygen and hydrogen can not pass through the hydrophilic film 45g unlike the hydrophobic films 44f and 45f.

Since the hydrophobic film 45f is provided annularly also on the outlet-side, bubbles generated from the electrode on the outlet-side of the surface of the electroosmosis material 51 can stably be discharged out without staying in the pump irrespective of attitude of the equipment.

As the hydrophobic films 44f and 45f, it is possible to use T020A produced by Advantech having the minimum breakthrough point (pressure value at which liquid starts passing through the film when internal pressure is increased) of 280 kPa. As the hydrophilic film 45g, it is possible to use SUPOR-450 produced by Nihon Pall Ltd. having the minimum bubble point (pressure value at which bubbles start passing through the film when internal pressure is increased) of 250 kPa.

(If the minimum bubble point of the hydrophilic film and the minimum breakthrough point of the hydrophobic film are higher, it is more preferable to prevent bubble leak of the hydrophilic film and liquid leak of the hydrophobic film, but since the film becomes more close-grained, pressure loss is generated when liquid passes through the hydrophilic film and bubble pass through the hydrophobic film, and the pump performance may be deteriorated. Therefore, it is necessary to set the hydrophilic film and the hydrophobic film in accordance with performance of the electroosmosis material.)

An outer periphery of the recess 45e is bonded to the pull-out electrode 54, and hydrogen bubbles generated from a cathode is induced toward the ventilation holes 45d.

It is possible to use adhesive to bond the inlet-side flow-path structure 44, the outlet-side flow-path structure 45 and the pull-out electrodes 53 and 54 to each other, and to bond the pull-out electrodes 53 and 54 and the holder 52 to each other, or holes may be formed in four corners and they may be screwed shut. The bonding condition or shape may freely be changed unless it is not contrary to the contents of the present invention.

[Operation of Connecting Structure of Liquid Sending Apparatus]

Next, the operation of the connecting structure 40 of the liquid sending apparatus will be explained.

First, the fuel cartridges 2 and 2 are attached to the flow-path control section 60, and the rod portion 41a is inserted into the check valve of the fuel discharge hole together with the hull 43. With this, the rod portion 41a comes into contact with liquid mixture in the fuel cartridges 2 and 2, and liquid mixture in the fuel cartridges 2 and 2 is absorbed by the first liquid-absorbing body 41 from the tip end of the rod portion 41a.

The liquid mixture absorbed by the first liquid-absorbing body 41 permeates the second liquid-absorbing body 42 and the electroosmosis material 51.

If voltage is applied between the two pull-out electrodes 53 and 54 in a state where liquid mixture permeates the electroosmosis material 51 such that an electrode on a surface which comes into contact with the second liquid-absorbing body 42 is an anode and an electrode on the opposite side is a cathode, liquid mixture in the electroosmosis material 51 obtains a driving force on the side of the cathode and moves, and liquid mixture in the second liquid-absorbing body 42 permeates the electroosmosis material 51 from the anode side. With this, liquid mixture is sent toward the cathode from the anode. The liquid mixture sent to the cathode passes through the hydrophilic film and flows into the connection tube 45a.

If the sending operation of liquid mixture is continued, oxygen bubbles near the anode generate hydrogen bubbles near the cathode by electrolysis of water in the liquid mixture. The oxygen bubbles are guided to outside along the slits 41c and 42c formed in the first liquid-absorbing body 41 and the second liquid-absorbing body 42. At that time, since the widths of the slits 41c and 42c are widened toward the outside, the small bubbles are guided while they are coupled to each other and become larger.

The oxygen bubbles discharged out from the slits 41c and 42c pass through the hydrophobic film 44f and the ventilation holes 44d through the recess 44e in the inlet-side flow-path structure 44, and are discharged out from the annular groove 44b and the straight groove 44c formed in the outer side of the inlet-side flow-path structure 44.

The hydrogen bubbles are carried from a location near the cathode by the liquid mixture, and are discharged out from the annular groove 45b and the straight groove 45c formed in the outer side of the outlet-side flow-path structure 45 through the recess 45e in the outlet-side flow-path structure 45 and through the hydrophobic film 45f and the ventilation holes 45d. Since the flow-path of the connection tube 45a is covered with the hydrophilic film 45g, hydrogen bubbles do not flow into the flow-path of the connection tube 45a.

Figure 11:
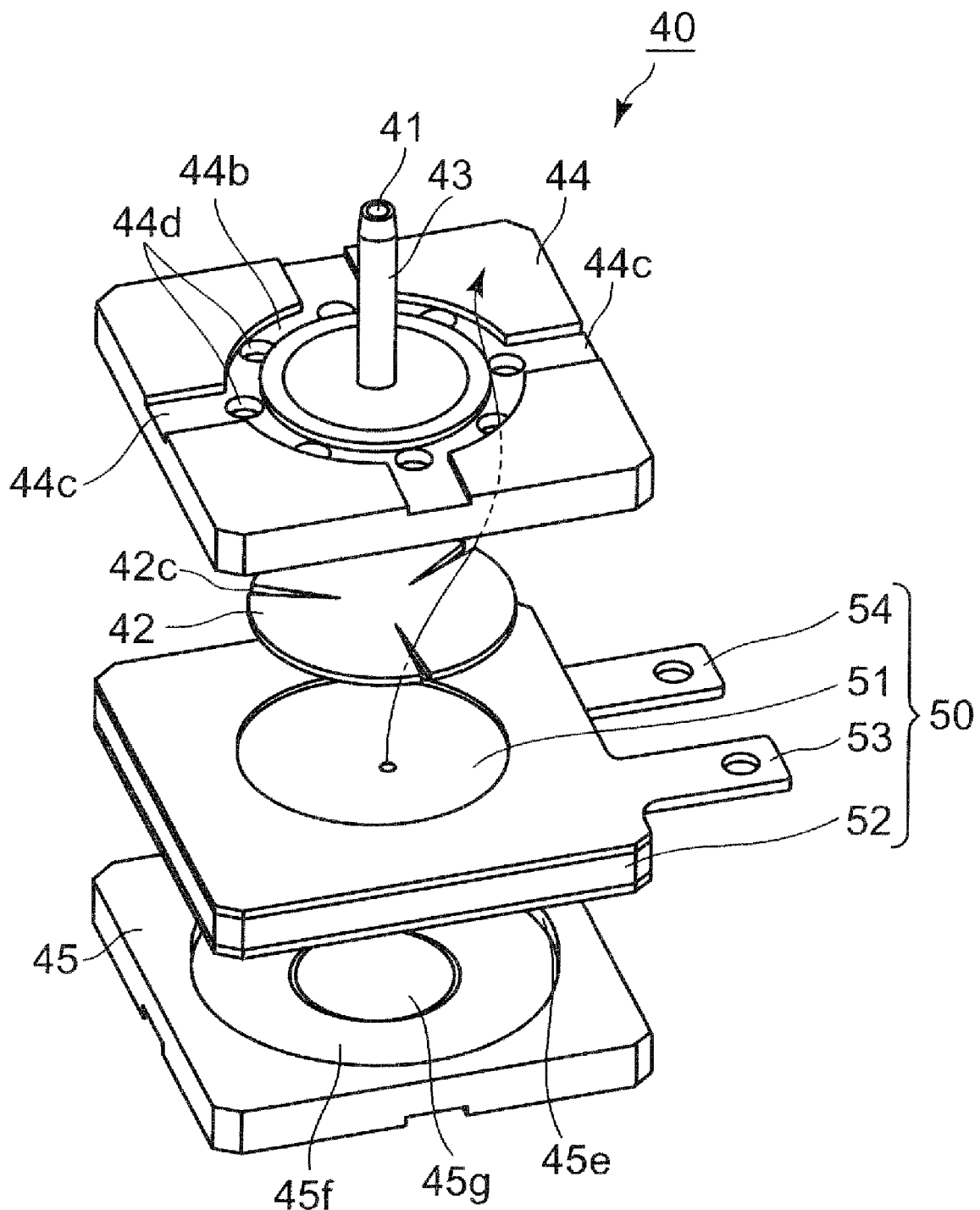
FIG. 11 is a diagram corresponding to FIG. 5 and showing a moving path for bubbles as viewed from the fuel cartridge 2.
Figure 12:
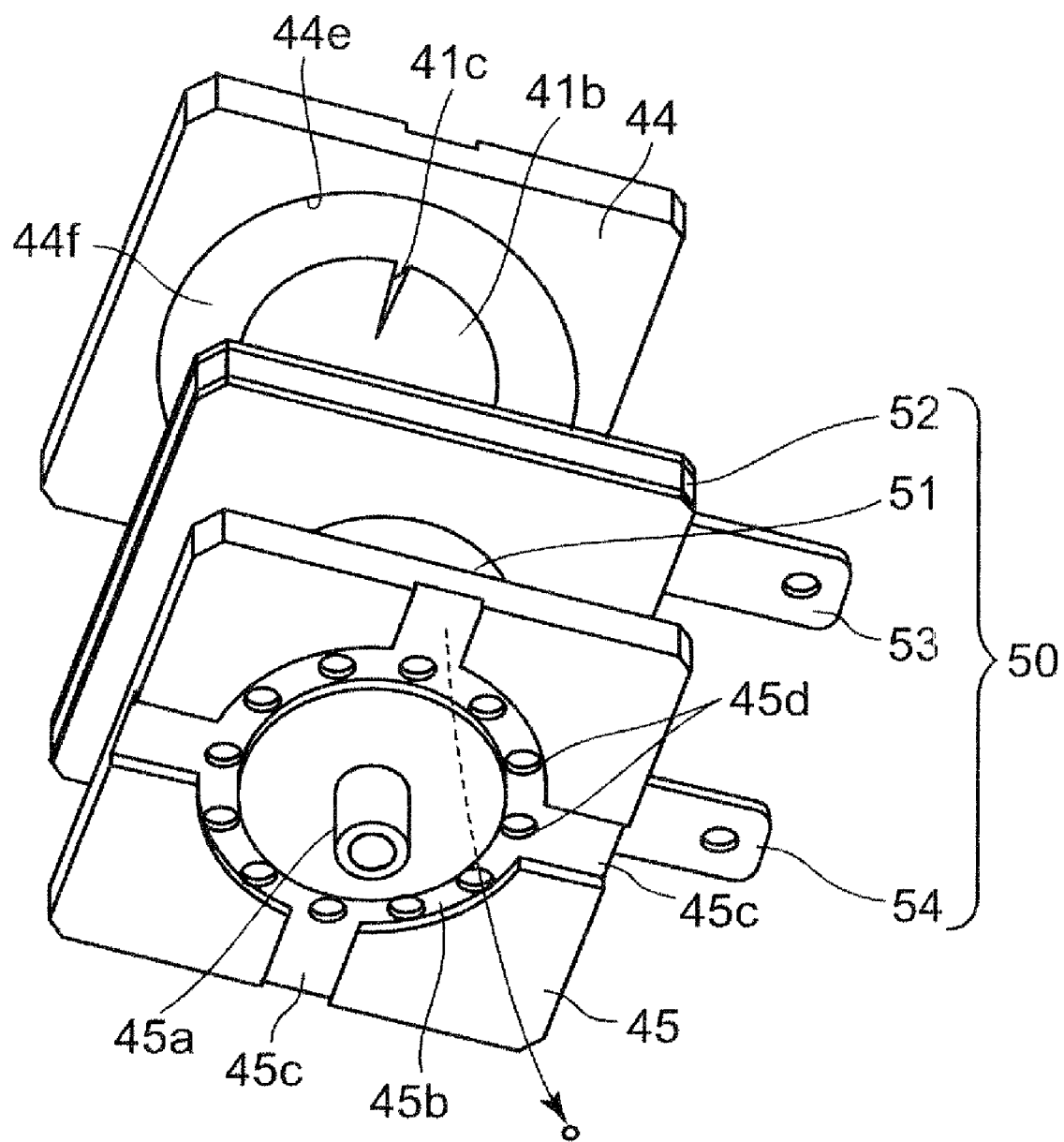
FIG. 12 is a diagram corresponding to FIG. 6 and showing the moving path for bubbles as viewed from the flow-path control section 60.
Figure 13:
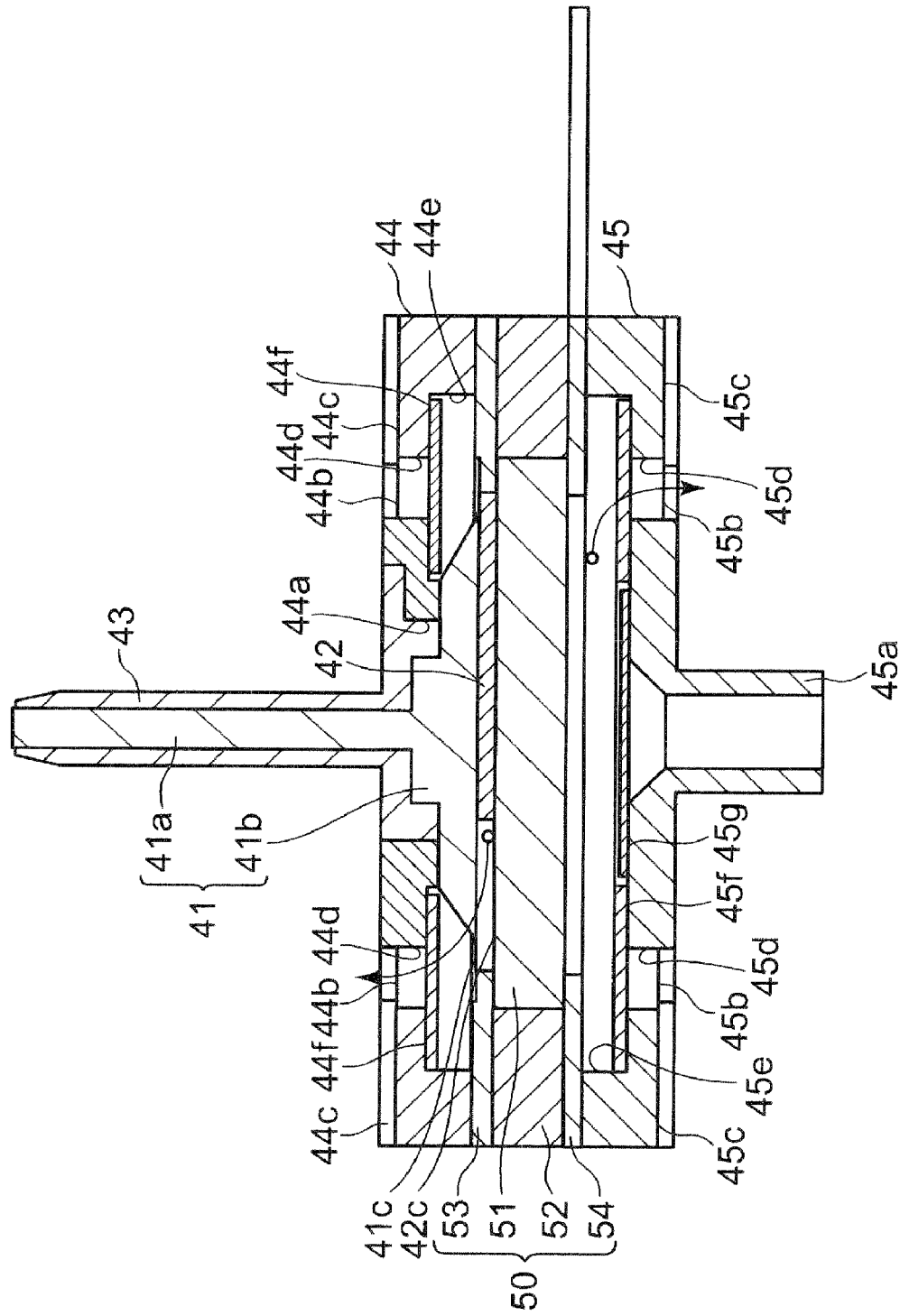
FIG. 13 is a diagram corresponding to FIG. 7 and showing the moving path for bubbles.

To make it is easy to understand the moving path (removing passage) for bubbles, FIGS. 11 to 13 show the removing passage for guiding bubbles to outside of the pump. FIGS. 11 to 13 correspond to FIGS. 5 to 7, respectively. In the drawings, white circles represents bubbles, and moving paths for bubbles are shown with arrows.

When a surface of the inlet-side flow-path structure 44 on the side of the fuel cartridge 2 is in intimate contact with a surface of the fuel cartridge 2, bubbles discharged from the inlet side ventilation holes 44d move through the annular groove 44b and the straight groove 44c. When a surface of the outlet-side flow-path structure 45 on the side of the flow-path control section 60 is in intimate contact with the surface of the flow-path control section 60, bubbles discharged from the outlet side ventilation holes 44d moves through the annular groove 45b and the straight groove 45c.

It can be found that a function for moving fuel toward a seat surface by a capillary attraction from a core portion of a porous body, and a bubble removing passage for guiding bubbles generated from the electrode of the electroosmosis material to outside of the pump are established at the same time.

According to the connecting structure 40 of the liquid sending apparatus of the embodiment, it is possible to remove bubbles generated by the electrode of the electroosmotic flow pump 50. Therefore, a phenomenon that an effective flow-path area of the electroosmosis material 51 is reduced by accumulation of bubbles generated near the upstream electrode does not occur, and the liquid sending efficiency of liquid can be maintained. Further, since bubbles generated near the downstream electrode do not flow into the flow-path of the connection tube 45a together with liquid, bubbles do not pass through the flow rate sensor 36 provided downstream, and it is possible to precisely detect a flow rate of liquid.

The hydrophobic film is formed annularly and the ventilation hole is disposed annularly. Therefore, it is possible to reliably remove bubbles without depending on a direction in which the connecting structure 40 of the liquid sending apparatus is disposed.

The hydrophobic film is formed annularly, and the hydrophilic film through which liquid passes is provided at a central portion on the same plane where the hydrophobic film is provided. Therefore, the thickness of the connecting structure 40 of the liquid sending apparatus can be reduced.

Embodiment 1

The T020A produced by Advantech as the hydrophobic film and SUPOR-450 produced by Nihon Pall Ltd as the hydrophilic film were combined with each other and used, and it was confirmed that liquid flowed to the downstream side flow-path through the hydrophilic film, and bubbles were discharged out from the oxygen removing passage formed in an outer side of the inlet-side flow-path structure and from the hydrogen removing passage formed in an outer side of the outlet-side flow-path structure through the hydrophobic film and ventilation hole by the internal pressure.

<Modification 1>

Figure 14:
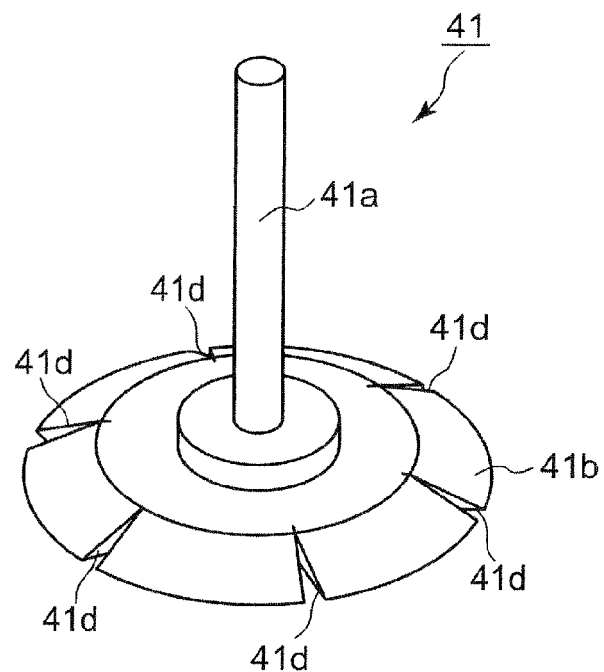
FIG. 14 is a perspective view of a modification of the first liquid-absorbing body 41 as viewed from the fuel cartridge 2.
Figure 15:
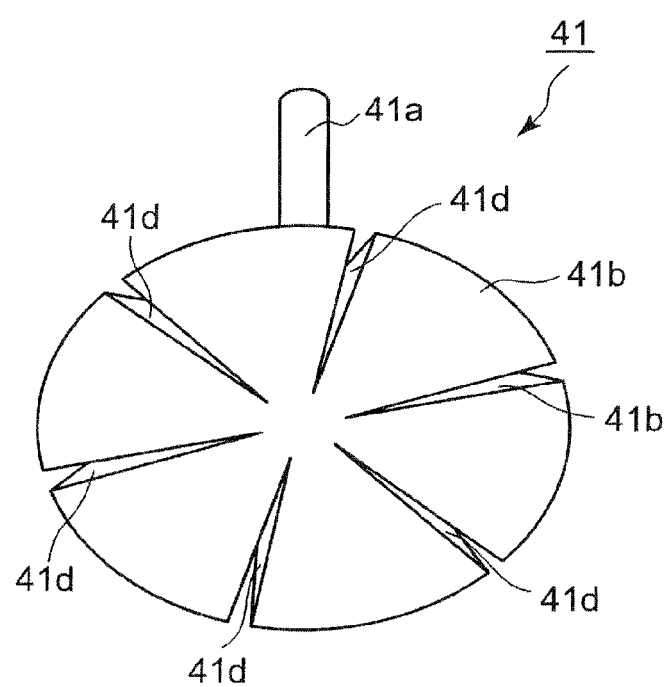
FIG. 15 is a perspective view of a modification of the first liquid-absorbing body 41 as viewed from the flow-path control section 60.

Although three slits 41c are formed in the disk portion 41b of the first liquid-absorbing body 41 in the above embodiment as shown in FIGS. 9 and 10, more slits 41d (six in FIGS. 14 and 15) may be formed, the second liquid-absorbing body 42 may also be formed with slits (not shown) so that bubbles can be discharged more easily as shown in FIGS. 14 and 15.

<Modification 2>

Figure 16:
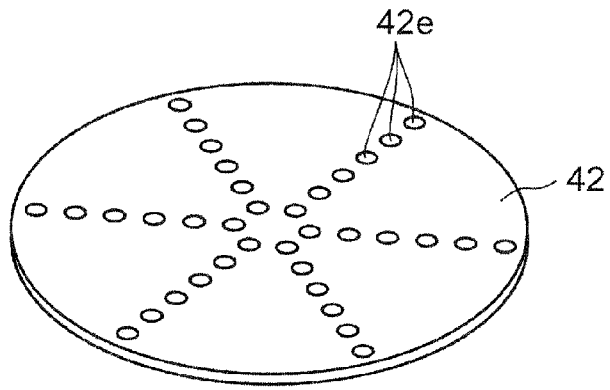
FIG. 16 is a perspective view showing a modification of a second liquid-absorbing body 42.

A plurality of through holes 42e may be formed radially in the second liquid-absorbing body 42 instead of the slits 42c as shown in FIG. 16 so that bubbles are discharged from the through holes 42e. Similarly, the first liquid-absorbing body 41 may be formed with a plurality of through holes (not shown) radially in the first liquid-absorbing body 41.

<Modification 3>

Figure 17:
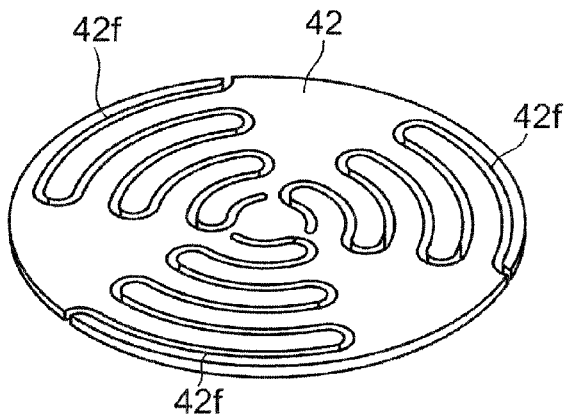
FIG. 17 is a perspective view showing another modification of a second liquid-absorbing body 42.
Figure 18:
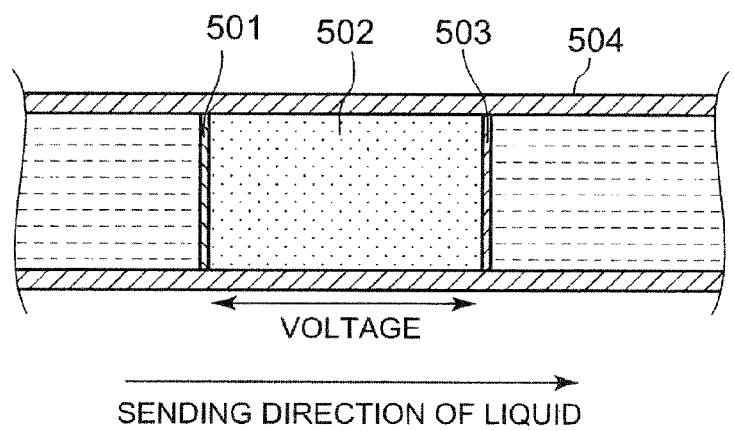
FIG. 18 is an explanatory diagram of a principle of the electroosmotic flow pump 50.

As shown in FIG. 17, a plurality of undulating slits 42f extending from the center toward an outer peripheral direction may be formed in the second liquid-absorbing body 42 instead of the radial slits 42c, and bubbles may be discharged from the undulating slits 42f. The first liquid-absorbing body 41 may be formed with the same undulating slits (not shown).

The entire disclosure of Japanese Patent Application No. 2006-263045 filed on Sep. 27, 2006 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A connecting structure of a liquid sending apparatus, comprising:
    an electroosmotic flow pump having a first electrode upstream of an electroosmosis material and a second electrode downstream of the electroosmosis material;
    a flow-path structure which defines with flow-paths for liquid upstream and downstream of the electroosmotic flow pump, which is provided upstream of the electroosmotic flow pump with a ventilation hole communicating with inside and outside of the flow-path, and which is provided with a hydrophobic film which covers the ventilation hole and is permeable to bubbles; and
    a liquid-absorbing body absorbs liquid, which is provided in the flow-path upstream of the electroosmotic flow pump, which comes into abutment against a surface of the electroosmosis material on which the first electrode is provided, and which is formed with a bubble removing passage which passes through the liquid-absorbing body from a hydrophobic film side thereof to the abutment surface against the electrode.

2. The connecting structure of the liquid sending apparatus according to claim 1, wherein the bubble removing passage is a slit formed in a direction from a center of the flow-path of the liquid-absorbing body toward an outer side of the flow-path.

3. The connecting structure of the liquid sending apparatus according to claim 2, wherein a width of the slit is increased from a center of the flow-path toward the outer side of the flow-path.

4. A fuel-cell type electricity generating apparatus comprising:
- the connecting structure of the liquid sending apparatus according to claim 1;
- a fuel cartridge into which the liquid-absorbing body is inserted; and
- a fuel-cell device to which fuel in the fuel cartridge is supplied by the connecting structure of the liquid sending apparatus.

5. An electronic device comprising:
- the fuel-cell type electricity generating apparatus according to claim 4; and
- an electronic device main body which operates by electricity generated by the fuel-cell type electricity generating apparatus.

* * * * *